Feb. 2, 1943.  M. GALLO  2,310,020
ELECTRODE HOLDER
Filed March 3, 1941  2 Sheets-Sheet 1
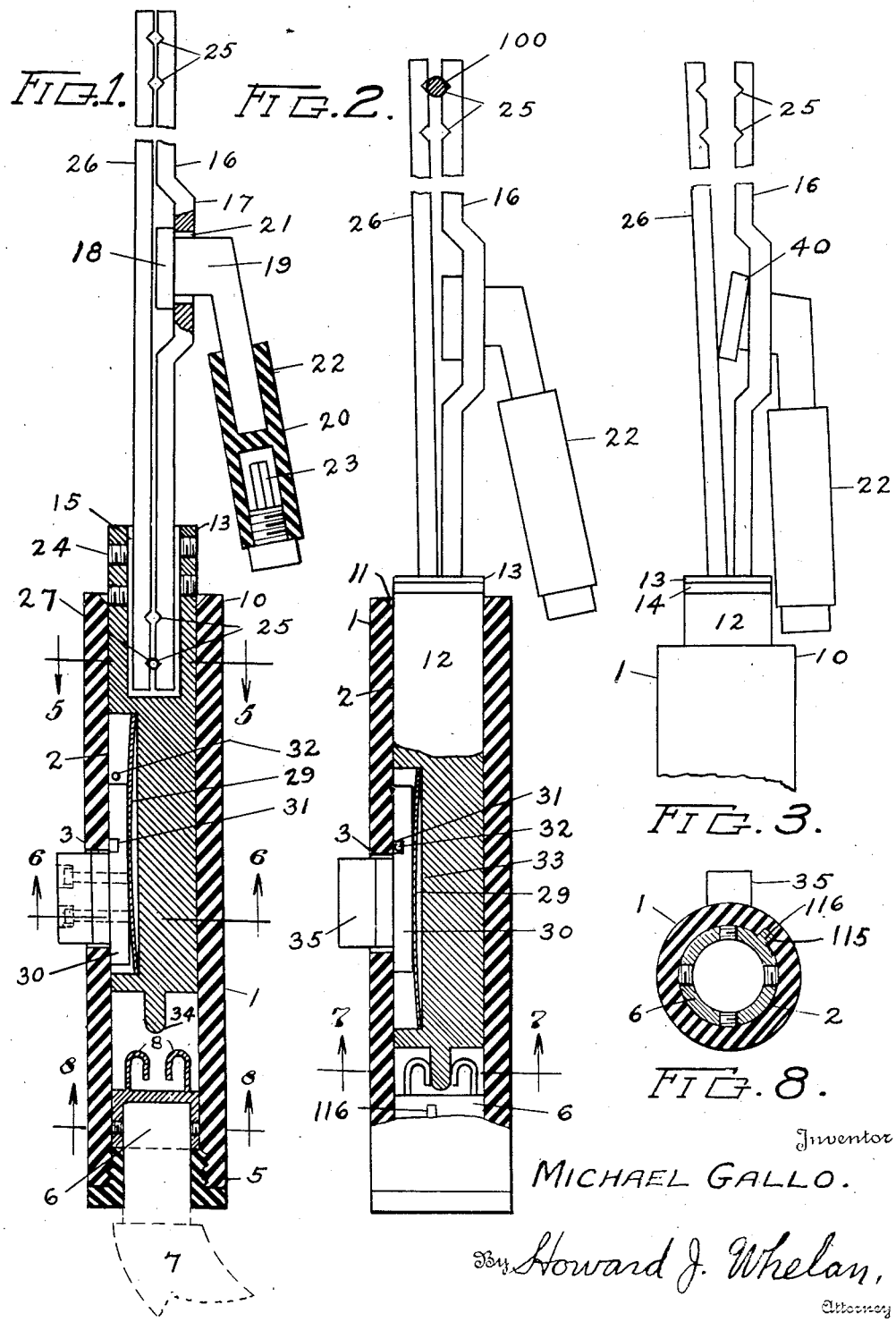
Inventor
MICHAEL GALLO.
By Howard J. Whelan,
Attorney Feb. 2, 1943.    M. GALLO    2,310,020
ELECTRODE HOLDER
Filed March 3, 1941    2 Sheets-Sheet 2

Inventor
MICHAEL GALLO.
By Howard J. Whelan.
Attorney

Patented Feb. 2, 1943

2,310,020

UNITED STATES PATENT OFFICE 2,310,020

ELECTRODE HOLDER

Michael Gallo, Baltimore, Md., assignor of fifty per cent to Howard E. Crook, Sr., Baltimore, Md.

Application March 3, 1941, Serial No. 381,438

2 Claims. (Cl. 219—8)

This invention refers to electrode holders for welding and particularly those belonging to the class pertaining to welding through manual operation and has the following objects: to provide a concealed switch construction for connecting and disconnecting current in the handle from the electrode holding members; to provide an arrangement whereby the operating parts of the switch construction will be locked in both connecting and disconnecting positions, after it is moved to either position; to provide an arrangement for increasing the life and use of the holding members by making them interchangeable in the handle used for manipulating them; to provide a simple yet none the less effective arrangement in the holding members that will enable them to hold, adjust or let go the welding rods as the operator may wish while using the device, through the use of the same hand that he employs to hold it. Another object is to provide a construction that will be of a substantial character with a minimum of loose parts; that will readily fit or assemble its different parts into place in relation to each other; that may be quickly inspected and repaired, and which will afford ample protection to the user against injury.

Other objects will become apparent as the invention is more fully set forth.

The developement that has taken place in the manually operated welding rod holders in recent years has progressed in variable degrees in many aspects of the art. In this invention the improvements extend principally in lines that afford a more practical tool or instrument designed to provide a welding rod holder that will be relatively easy to use; that may be electrically disconnected in a safe and effective manner and which will enable the rods to be adjusted, inserted or removed through the use of the same hand that is holding the device. Its structure consists of a fully insulated handle which encloses the electrical connections and switching arrangement of the holder, the holding members for the electrodes and the hand operated separation lever for adjustably spreading the rod holding members. The latter is of very simple construction that eliminates the use of pins and parts that would usually require considerable labor for their attachment and care in their placement.

In the drawings, which illustrate an example of this invention:

Figure 1 is a longitudinal sectional view taken through a welding rod holder embodying this invention; with its holding members in closed position and switch members in open position;

Figure 2 is also a longitudinal sectional view taken through the welding rod holder in locked position, with the holding members holding a welding rod, and switch members in closed position;

Figure 3 is a detail view of the holding members with the holding members opened apart by the manipulation of its separation lever;

Figure 8 is a section taken on line 8—8, of Figure 1.

Similar reference characters refer to similar parts throughout the drawings.

Figure 4:
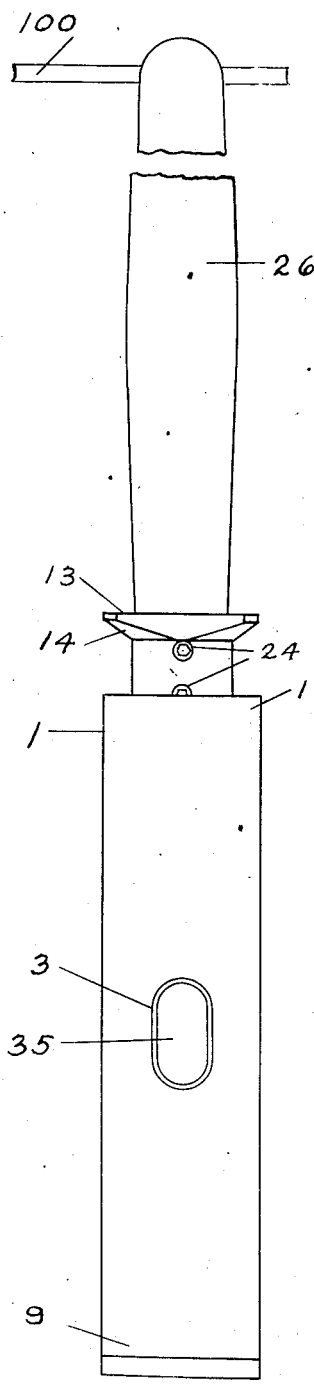
Figure 4 is a plan view of the complete device assembled; with its holding members holding a welding rod.
Figure 5:
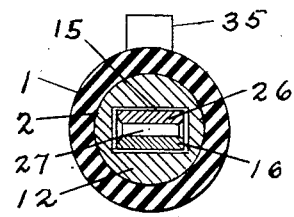
Figure 5 is a transverse section through the handle portion of the holder along the line 5—5, of Figure 1.
Figure 6:
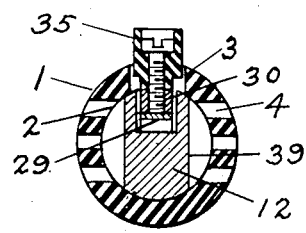
Figure 6 is a section taken on the line 6—6, of Figure 1.
Figure 7:
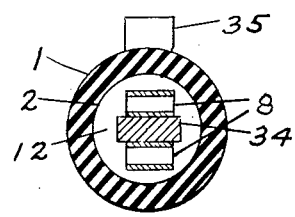
Figure 7 is a section taken on line 7—7, of Figure 2.

In the construction shown in the drawings, its handle 1 is preferably of an insulating material like hard rubber or fibre. It is cylindrical in form with a passage 2 running its entire length. A slot 3 is provided for the insertion of a switch block and with holes 4 for ventilating the interior. One end portion 9 is screw threaded at 5 and has a key slot 115 to contact key 116 to guide the insertion of plug 6 which holds the conducting cable 7 and the contact elements 8 for carrying current into the device. The other end portion 10 is smooth interiorly and has a bevel 11 arranged in it for holding the yoke 12 in its proper alignment in the handle.

The yoke consists of a metal or conducting body preferably made in a form like that indicated in the drawings, wherein its head portion 13 is shaped to fit into the end portion 10 and with its under portion 14, in the bevel 11. The head is cut out internally at 15 in a rectangular manner, so that two flat metal rod holder blades 16 and 26 may fit with their surfaces in spaced contact with each other, as indicated. The middle portion 17 of the rod holder blade 16 is formed to allow the flat rectangular head 18 attached to the flat sided shank 19 to position itself in between the holder blades and to allow the shank to operate in the rectangular slot 21. The angularly positioned lever 20 attached to the shank 19 enables the hand of the user to manipulate the head and to force the outer portions of the members 16 and 26 apart for the insertion, removal or adjustment of the welding rods 100. This lever is provided with a strong insulation shell 22 that prevents injury to the user by heat or electricity. This shell is hollowed out to take a wrench member 23 that is used to tighten or loosen set screws 24 in the yoke 12 which serve to adjust the control on the rectangular sectioned blades 16 and 26 in the yoke. The square sided slots 25 in both ends of the blades serve as clamping edges for the welding rods. Both end portions of the rod holder blades are symmetrical and can be interchanged in position in the head of the body. This permits either end to be used for holding rods, or to be used for insertion in the handle 1, as may be preferred. A pin or key 27 is placed in one of the sets of slots 25 that are positioned in the head portion 13, to provide a pivot and better control the members 16 and 26 and prevent their misalignment. The slot 15 in the yoke allows access to the portions of the blades in the head portion 13 and for the insertion or removal of the pin 27 and serves to hold the latter in place. A groove 33 is provided longitudinally in the body and retains a flat spring 29 and the locking piece 30. The spring acts resiliently on the locking piece. This locking piece has a slot 31 across its face transversely into which rests the cross piece 32 mounted in the body and crossing the front of the groove 33. A conductor knife 34 attached to the back end portion of the yoke 12 is formed to fit within the resilient contact elements 8 when the holder is arranged to carry current to the holder members.

When the yoke is in position within the handle, its locking piece 30 is positioned under the slot 3 so that the button 35 may be attached to it. The button or switch block 35 serves to hold the locking piece and operate the same when the yoke is moved longitudinally into the handle. The sides 39 of the yoke are made to provide a spacing between them and the inside surface of the shell as shown.

In the normal use of the device, the holder blades with the pin 27 in position and lever 20 in place, are inserted into the yoke and the set screws 24 tightened on them to fasten them securely. The head portion 13 is brought close to the end portion 10 of the shell. The switch block 35 is then attached to the locking piece. Then the yoke is forced into the shell until its head 13 rests on the end portion 10 and the underportion 14 is aligned in the bevel 11. This also brings the knife 34 into place in between the contact elements 8, and allows current to flow from the cable 7 into the metal yoke 12, and thence to the blades and welding rod. The welding rod may be placed in either of the slots 25 at the outer end of the blades, according to its size or form or the incidental convenience. The blades 16 and 26 have the pin 27 inserted in one of the pairs of slots 25 disposed in the handle at the time. The action of the pin varies according to which set of slots it is in. The resiliency of the holding action of the blades is increased as the slots 25 further away from the outer end of the blades are used. This makes the blades adaptable for varied forms of welding rods. The pin 27 forms a fulcrum on which the blades may swing and creates the space between the blades for the movement. The operation of the angular positioned lever 20 seems to be obvious in the drawings. The fulcrum of the lever is at the edge 40 of the head 18 when the lever is pressed towards the handle 1, for spreading the blades. The position of the head nearer the fulcrum enables the opening of the blades to be considerably more at the slots where the welding rod is than the spread at the head. The resiliency also is stronger in this arrangement. The holes 4, in the wall of the shell handle afford ventilation for the release of heat from the internal conducting parts of the body or yoke, and enable the user to keep informed as to any unusual situations arising in the interior of the shell. When the handle 1 is moved across the yoke, the surface of its slot presses against the depressed switch block holding the locking piece 30. This holds the locking piece stationary except for its resilient movement inwards. The yoke is moved until its cross piece 32 engages in the slot 31, and thus locks it in place subject to its removal under extra efforts on the part of the user, when the yoke is to be removed from the shell.

While but one form of the invention is indicated in the drawings, it is not desired to limit this application for patent to this particular form, or in any other way, otherwise than limited by the scope of this application, as it is appreciated that many other forms, using the same principles, could be made and come within the field of the appended claims.

Having thus described the invention, what is claimed is:

1. In an electrode holder of the class described, comprising a handle formed from insulating material, a blade retainer slidably mounted in one end of the handle and locked in position by a depressible locking electric switch means which projects through the said handle, elongated rectangular blades arranged parallel to each other and having transverse grooves adjacent their end portions symmetrically arranged for interchanging welding rod and a pivot pin and inserting same in said handle, one of said blades being straight and the other blade having its middle portion bent to form a recess through which a lever passes to operate a head attached thereto and providing a separating block for rotating movement with its transverse edges contacting portions of the inner surfaces of the blades to force same apart and loosen the welding rod, a metal plug contactor element inserted in the other end of said handle and connected with an electrical cable.

2. In an electrode holder of the class described, comprising a tubular handle formed from insulating material, a metal plug contactor element inserted in one end of said handle and connected to an electrical cable, a blade retainer inserted in the opposite end of said handle having its curved surfaces contacting the inner curved surface of said handle and straight sides to provide air space between the handle and the blade retainer for air circulation, a switch blade attached to the inner end of the retainer and operable to open or closed position through a circuit and retainer locking means located in the retainer and handle, a pair of rectangular shaped blades arranged parallel to each other and having transverse grooves adjacent their end portions symmetrically arranged for interchanging the welding rod in one end for a pivot pin in the other end and inserting the end with the pivot pin into the retainer, one of said blades being straight and the other having its middle portion bent to form a recess through which a lever may pass to operate a head attached thereto and disposed in the recess between the blades, said head forming a separating block for rotating movement with its transverse edges contacting portions of the inner surfaces of the blades to force same apart and loosen up on the welding rod.

MICHAEL GALLO.